United States Patent [19]
West, Jr.

[11] Patent Number: 5,144,267
[45] Date of Patent: Sep. 1, 1992

[54] VARIABLE SLOPE NETWORK FOR OFF-PREMISES CATV SYSTEM

[75] Inventor: Lamar E. West, Jr., Maysville, Ga.

[73] Assignee: Scientific-Atlanta, Inc., Norcross, Ga.

[21] Appl. No.: 619,630

[22] Filed: Nov. 28, 1990

Related U.S. Application Data

[63] Continuation-in-part of Ser. No. 446,603, Dec. 6, 1989.

[51] Int. Cl.[5] .......................... H03H 7/03; H03H 7/07
[52] U.S. Cl. .................................... 333/28 R; 333/171
[58] Field of Search ...................... 333/28 R, 170, 171, 333/18

[56] References Cited

U.S. PATENT DOCUMENTS

| | | | |
|---|---|---|---|
| 2,777,994 | 1/1957 | Hurault | 333/28 R X |
| 3,755,737 | 8/1973 | Eller . | |
| 3,806,814 | 4/1974 | Forbes . | |
| 4,024,575 | 5/1977 | Harney et al. | 358/118 |
| 4,039,954 | 8/1977 | den Toonder . | |
| 4,225,976 | 9/1980 | Osborne et al. | 455/226 |
| 4,245,245 | 1/1981 | Matsumoto et al. | 358/122 |
| 4,367,557 | 1/1983 | Stern et al. | 455/4 |
| 4,418,424 | 11/1983 | Kawamoto et al. | 455/4 |
| 4,450,481 | 5/1984 | Dickinson | 358/114 |
| 4,769,838 | 9/1988 | Hasegawa | 380/7 |
| 4,827,511 | 5/1989 | Masuko | 380/15 |
| 4,829,593 | 5/1989 | Hara | 455/234 |
| 4,912,760 | 3/1990 | West, Jr. et al. | 380/7 |
| 4,967,169 | 10/1990 | Sun et al. | 333/28 R |
| 5,014,309 | 5/1991 | West, Jr. | 380/7 |

FOREIGN PATENT DOCUMENTS

| | | | |
|---|---|---|---|
| 43608 | 3/1983 | Japan | 333/28 R |
| 495815 | 11/1938 | United Kingdom | 333/28 R |

*Primary Examiner*—Paul Gensler
*Attorney, Agent, or Firm*—William A. Marvin

[57] ABSTRACT

A three terminal compensation network for frequency dependent attenuation has a control terminal, an input terminal, and an output terminal. The network is particularly useful for an off-premises CATV system for slope compensation of a broadband television signal. The control terminal is supplied with a voltage indicative of the amount and direction of the slope in the actual television signal. The voltage oppositely biases a set of diodes which are used as controlled resistances in a pair of tuned circuits in the network. One series tuned circuit provides for varying degrees of negative slope compensation and a parallel tuned circuit provides for varying degrees of positive slope compensation. The network elements are connected in a modified bridge T configuration such that the characteristic impedance of the CATV system (75 ohms) can be approximately matched for the input and output of the broadband television signal.

20 Claims, 5 Drawing Sheets

VARIABLE SLOPE NETWORK FOR OFF-PREMISES CATV SYSTEM

CROSS REFERENCE TO RELATED APPLICATIONS

This application is a continuation-in-part of application U.S. Ser. No. 446,603 by L. West for "Picture Carrier Controlled Automatic Gain Control Circuit for Cable Television Interdiction or Jamming Apparatus" filed Dec. 6, 1989 and which is commonly assigned. The disclosure of West is hereby incorporated by reference.

FIELD OF THE INVENTION

The invention pertains generally to compensation networks which are frequency dependent and is more particularly directed to a variable slope compensation network for an off-premises or interdiction type CATV system.

BACKGROUND OF THE INVENTION

An off-premises cable television (CATV) system generally comprises a headend for transmitting television programs with a broadband television signal including regular and premium channels over a cable plant to a multiplicity of subscribers. The cable plant can include a number of trunk lines from which a plurality of feeder lines fan out over a service area. From each feeder line, there are a large number of taps for subscriber drops to individual premises. At each of the taps or along the subscriber drops are interdiction apparatus which inject a jamming signal into those premium or restricted channels that the particular subscriber is not authorized to view. An advantageous interdiction CATV system of this type is more fully set forth in U.S. Pat. No. 4,912,760 by West, et al., the disclosure of which is herein incorporated by reference.

Because of the cable plant characteristics, during transmission the broadband television signal is nonlinearly attenuated, specifically, more at high frequencies than at low frequencies. This nonlinear attenuation as a function of frequency is typically termed slope in the CATV industry. Therefore, to correct this condition, slope compensation is provided in the transmission system by circuits which are frequency dependent in the opposite direction of the cable characteristic thereby cancelling the effect. This correction is normally provided as a function of frequency with a positive slope. However, not all frequency correction is necessarily in the positive direction. During the transmission phase of the signal, transmission amplifiers may add frequency dependent gain so that as the signal travels down the distribution plant it will droop with frequency less rapidly. Therefore, it is not always easy to determine what the slope of the signal will be at a subscriber drop so that a fixed correction may be applied.

To be of advantage in an off-premises site, a slope network must then be prepared to correct for either positive, negative, or zero slope (it must not introduce a correction where none is needed).

Normally, a slope correction network is inserted serially in the path of the broadband television signal. This raises concerns about the return loss of the circuit at the input side and the output side. If the return loss can be maximized, the network will minimize artifacts in the transmitted picture resulting from reflected power. It is known that the manner in which to maximize return loss is to match the output impedance of the previous circuit with the input impedance of the slope network and match the output impedance of the slope network to the input impedance of the next circuit. However, to maximize return loss while providing a flexible frequency dependent circuit with positive and negative slope correction has in the past proven difficult and relatively expensive.

Prior slope compensation networks measured the absolute level of two pilot signals of the broadband signal to determine the amount of correction. A pilot frequency on one end of the band was measured and utilized for slope correction and a pilot frequency at the other end of the band was measured and utilized for gain correction. This circuit requires relatively expensive band pass filters for the measurement of the pilot frequencies and further that the filters be set to detect frequencies which are always present. While this is not too burdensome when talking about trunk amplifiers where the cost per unit can be large because there are so few, this becomes much more of a problem when providing a slope correction network for interdiction apparatus because of the number of units. Even more burdensome is this problem when individual subscriber interdiction units are utilized.

Another problem with the prior slope correction networks is that they usually have two control terminals. This contemplates that the levels from the pilot frequency detectors are at the same levels and that components in the detection circuits do not age at different rates. The dual control inputs also make the networks more complex and costly than need be thereby prohibiting their use for cost reasons in the subscriber sections of interdiction devices.

SUMMARY OF THE INVENTION

Therefore, it is an object of the invention to provide a flexible slope compensation network which is adapted to provide various amounts of positive, negative, or neutral slope to a broadband television signal.

It is a further object of the invention to provide a slope compensation network which is cost effective and simple in construction so that it may be used in an off-premises interdiction apparatus.

It is a still further object of the invention to provide an slope compensation network for an interdiction apparatus which has only one control terminal.

Another object of the invention is to provide a slope compensation network for an interdiction apparatus which maximizes the return loss to the previous network and from the subsequent network.

In accordance with these objects, the invention provides a slope compensation network comprising an input impedance matching network, an output impedance matching network, and a frequency dependent attenuation network. The frequency dependent attenuation network is connected to the junction of the input matching network and the output matching network. The frequency dependent network includes a single control terminal which varies the slope compensation as a function of the amplitude of a variable control voltage. The direction of the slope depends on the whether the control voltage is above or below a reference value and the amount of slope depends on the absolute magnitude of the control voltage.

In a preferred embodiment of the invention, a modified bridged T network is utilized for impedance matching to both the input and output of the network and for frequency dependent attenuation with one control terminal. An automatic slope control measures the actual amount of slope in a broadband television signal applied to an interdiction apparatus and develops a control voltage which is indicative of the amount and direction of the actual slope. The invention utilizes an impedance matching resistance connected in series with another impedance matching resistance connected between the input to the slope compensation network and its output. A bridging resistance is connected in parallel with the impedance matching network between the input and output.

A parallel frequency dependent network is connected between the junction of the impedance matching network and ground. The frequency dependent network comprises in one leg a diode serially connected to a parallel tuned circuit and in the other leg an oppositely poled diode serially connected to a series tuned circuit. A DC bias voltage is applied to the junction, and the control voltage to each of the diodes.

Depending upon whether the control voltage is more or less than the bias voltage, one of the diodes is blocked and the other is conducting. The conducting diode acts as a voltage variable resistance and controls the frequency dependent attenuation with the tuned circuit which is active. Positive slope compensation is provided by the parallel tuned circuit and negative slope compensation by the series tuned circuit.

These and other objects, aspects, and features of the invention will be more clearly understood and better described if a reading of the following detailed description is undertaken in conjunction with the appended drawings wherein:

DETAILED DESCRIPTION OF THE PREFERRED EMBODIMENT

Figure 1:
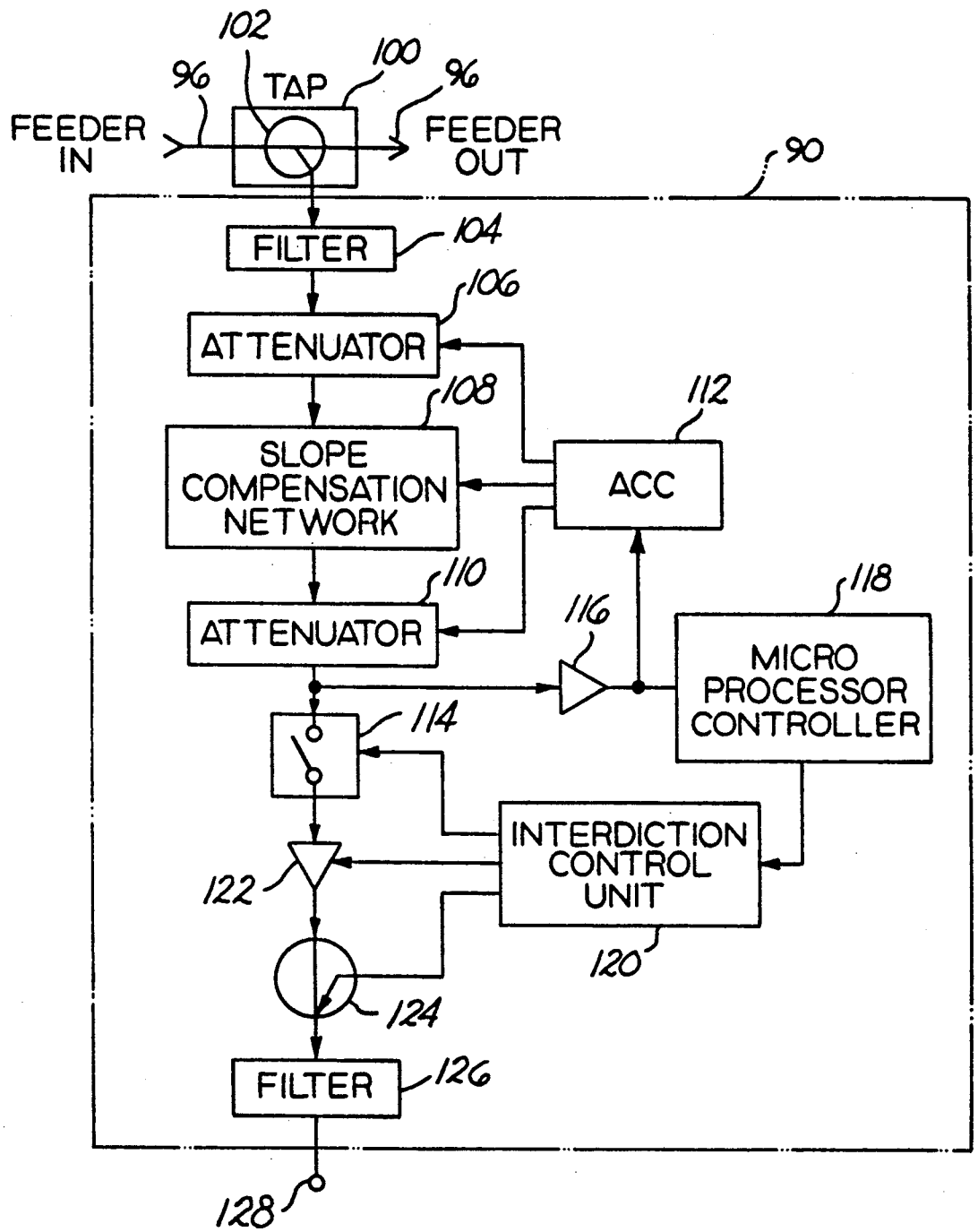
FIG. 1 is a generalized block diagram of an interdiction apparatus including a variable slope compensation network constructed in accordance with the invention.

FIG. 1 illustrates the utilization of a slope compensation network 108, constructed in accordance with the invention, in an interdiction device 90 as more fully set out in the West, et al. patent. At a tap 100, a directional coupler 102 taps into a broadband television signal serving a feeder cable 96. A broadband spectrum of CATV RF signals is thus output to a high pass filter 104. The high pass filter 104 passes a band of frequencies comprising at least the data carrier frequency and the CATV channel spectrum. The CATV spectrum presently comprises a frequency band from about 54 MHz. to 550 MHz. and the data carrier is at 108.2 MHz.

The interdiction apparatus 90 Comprises a series of gain controlled devices including an attenuator 106, the slope compensation network 108, and an attenuator 110. These devices are regulated by an automatic compensation control 112 which varies the amplitude of the broadband television signal by controlling the attenuation of the attenuators 106, 110 and by controlling the attenuation of the slope compensation network 108. A feedback signal representing part of the CATV spectrum is input through an amplifier 116 to the automatic compensation circuit. The automatic compensation control 112 normally includes an automatic gain control and an automatic slope control which independently generates a signal to the slope compensation network to vary its response. Also connected to the output of the amplifier 116 is a microprocessor controller 118 for receiving data from a headend (not shown). The received data may be stored in a nonvolatile memory of the microprocessor controller 118. Further data may be subsequently downloaded when needed to an interdiction control unit 120 via a serial interface connecting the microprocessor controller 118 with the control unit 120.

The interdiction control unit 120 controls a subscriber disconnect switch 114, a subscriber amplifier 124 and a directional coupler 124 to perform the interdiction function. The disconnect switch 114 can be used to remove all service from a subscriber. The amplifier 122 is used as a final fixed gain adjustment of the broadband signal before interdiction is applied by introducing jamming signals into the CATV spectrum through the coupler 124. The signal is then filtered by the high pass filter 126 before being delivered to a subscriber drop 128. While the invention will be described in the context of the interdiction apparatus 90, it will be evident that the various embodiments can be used in the broader context of frequency dependent compensation circuits.

Figure 2:
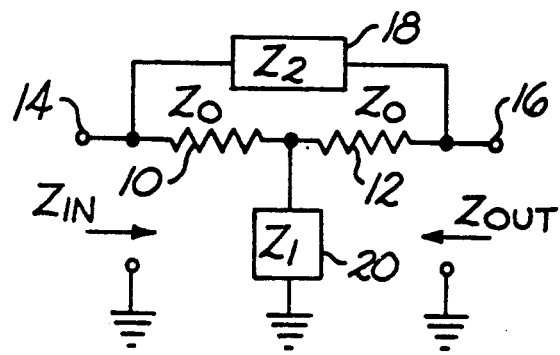
FIG. 2 is a generalized schematic circuit diagram of a prior art bridged T network.

To better illustrate the invention, the features of a prior art circuit, the bridged T network, will now be described. It is known that a bridged T network, such as that illustrated in FIG. 2, has advantageous impedance matching characteristics. The bridged T network comprises matching impedance 10 coupled serially with matching impedance 12 between an input terminal 14 and an output terminal 16 of the network. Impedance 18 bridges the matching impedances between the input and output terminals 14 and 16, and impedance 20 is connected between the junction of impedances 10 and 12, and ground.

It can be shown that if impedance 10 equals impedance 12, for example, being of an impedance Z0, then for a wide range of impedances for elements 18 and 20, Z1 for impedance 20 and Z2 for impedance 18, the input impedance of the network will be the same as the output impedance of the network, i,e., Z0. This relationship holds providing Z1, Z2 are duals. This means that the impedances 18 and 20 have inverse current-voltage characteristics.

While the impedance match is governed by Z0, the attenuation characteristics and frequency response of the circuit are governed by the values of Z1, Z2. These characteristics can be exploited for a variable compensation network generally illustrated in FIG. 3. The matching impedances 10 and 12 remain the same from FIG. 2, but the impedances 18 and 20 have been split apart to form other dual networks. Impedance 20 becomes the parallel combination of a serially connected variable resistor 30 and an impedance 32 with a serially connected variable resistor 34 and an impedance 36. Impedance 18 becomes the serial combination of parallel connected variable resistor 22 and a impedance 24 and a parallel connected variable resistor 26 and an impedance 28. Z1a, Z1b, Z2a and Z2b are LC tank circuits of either serial or parallel configuration. Z1a and Z2a; Z1b and Z2b; R1a and R2a; R1b and R2b are dual networks. R1a, R2a; R1b, R2b are controlled resistances.

Figure 3:
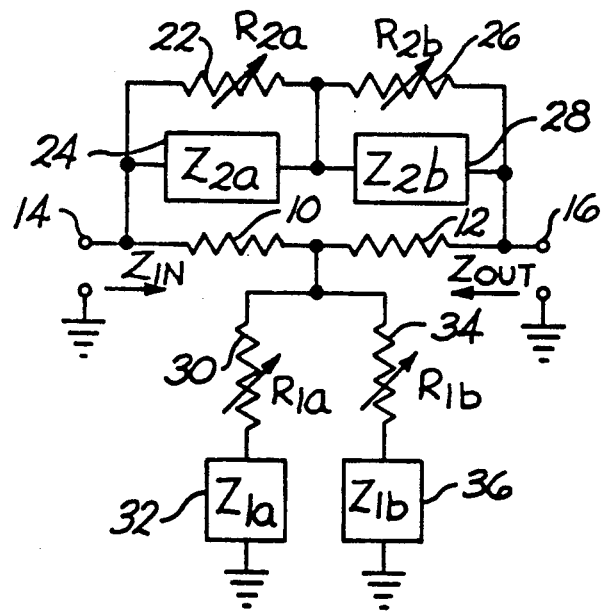
FIG. 3 is a schematic circuit diagram of a frequency dependent compensation network constructed in accordance with the invention.

The network illustrated in FIG. 3 can be used effectively as a slope compensation circuit with maximum return loss when the impedance value Z0 is chosen as the characteristic impedance of the previous network and subsequent network, in cable television systems this is generally 75 ohms. The controlled resistances R1a, R1b, R2a, R2b can be varied by a parameter indicative of the actual tilt correction needed by the system. If the control signals are applied to the variable resistances such that the duality of the circuits are maintained, the impedance matching advantages of the circuit will be availed.

Figure 4:
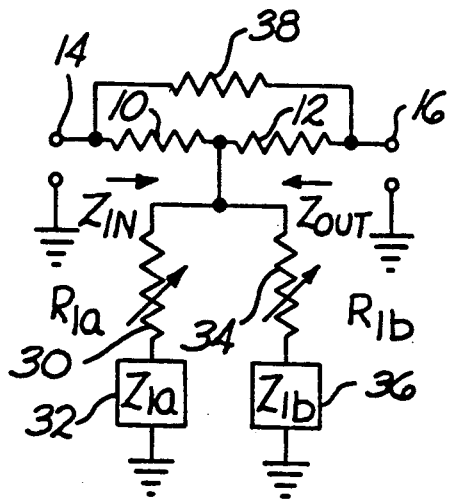
FIG. 4 is a schematic circuit diagram of a simplified version of one preferred implementation of the slope compensation network illustrated in FIG. 3.
Figure 5:
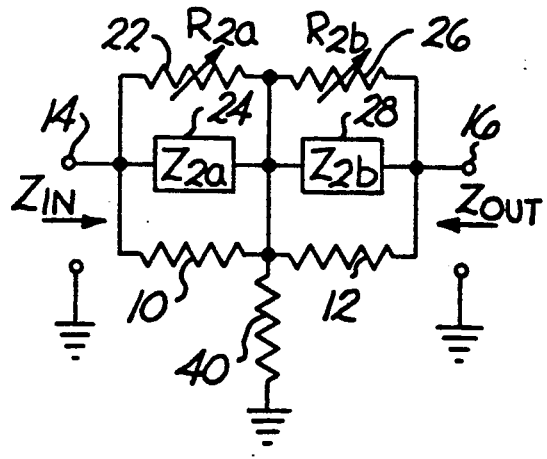
FIG. 5 is schematic circuit diagram of a simplified version of another preferred implementation of the slope compensation network illustrated in FIG. 3.

FIGS. 4 and 5 illustrate simplifications of the generalized embodiment of FIG. 3 where elements 22, 24, 26 and 28 have been replaced by a fixed resistor 38 in FIG. 4, and elements 30,32, and 34, and 36 have been replaced by a fixed resistor 40 in FIG. 5. It was determined that the simplification could be accomplished without losing much of the impedance matching of the circuit because, over the CATV spectrum, the combined impedance of the dual component did not vary that significantly. However, the impedances 10 and 12 are no longer equal, and it is the three elements which must be chosen together, for example, resistances 10, 12, and 38 or resistances 10, 12, and 40. The simplification also provides another advantage in that only two controlled resistances remain, thereby allowing each to be controlled oppositely by a single control terminal.

Figure 6:
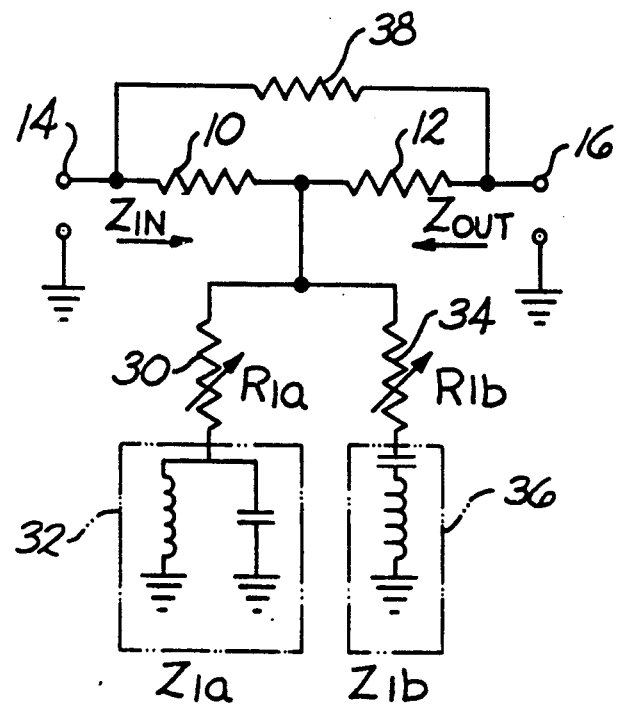
FIG. 6 is a schematic circuit diagram of a particularly advantageous implementation of the slope compensation network illustrated in FIG. 4.

FIG. 6 illustrates a specific embodiment of FIG. 4 where impedance 32 is a parallel tuned circuit and impedance 36 is a series tuned circuit. These types of circuits may be controlled in an opposite direction with facility to provide negative or positive frequency dependent compensation.

Figure 7:
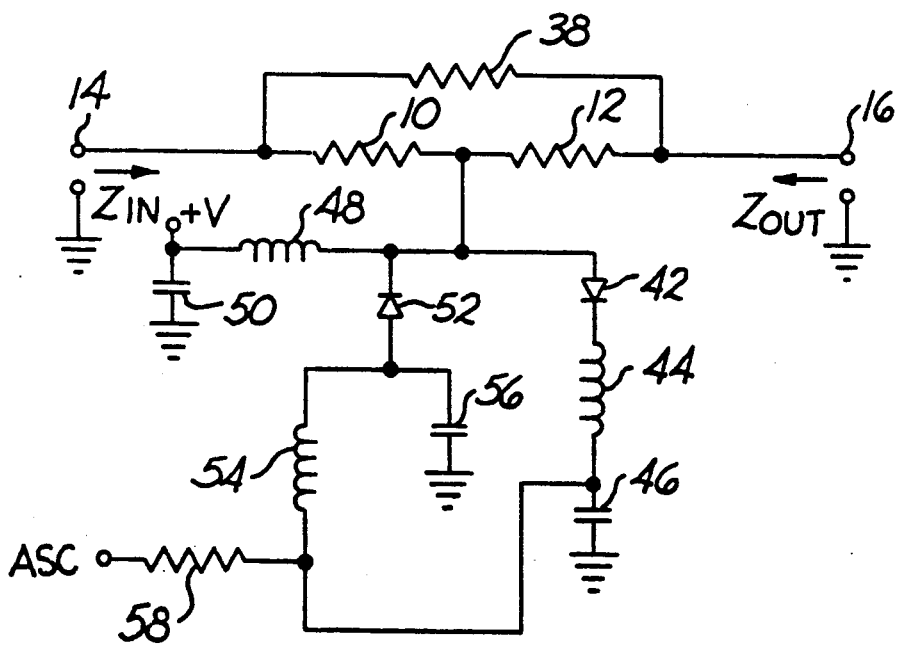
FIG. 7 is a schematic circuit diagram of a particularly advantageous implantation of the slope compensation network illustrated in FIG. 6.

FIG. 7 illustrates a preferred implementation for a slope compensation network for the off-premises CATV system. The network is a specific implementation of the network illustrated in FIG. 6 and is preferably connected as shown in FIG. 1. A series combination of resistor 10 and 12 form an impedance matching network with a junction node 11 to produce frequency dependent compensation for a broadband RF television signal passing between the input terminal 14 and output terminal 16. A bridging resistor 38 is also connected between the input terminal 14 and output terminal 16.

A DC bias level is provided to the junction node 11 of the resistors 10, 12 via an inductor 48 which has its other terminal connected to a voltage source, +V. A filter capacitor 50 is further connected between the source and ground. One control leg of the slope compensation network comprises a parallel tuned circuit of inductor 54 and capacitor 56 connected through a diode 52 to the junction node 11. The other control leg of the slope compensation network comprises a series tuned circuit of inductor 44 and capacitor 46 connected to the junction node 11 through diode 42.

A control signal voltage ASC, from an automatic compensation control is applied to both control legs through a resistor 58. Basically, the current through inductor 48 provides a DC bias to the junction node from the voltage +V. The ASC signal provides a DC control voltage which regulates the frequency dependent legs in an opposite manner. For example, if the ASC signal is above the bias voltage, diode 52 will conduct and diode 42 will be blocked. If the automatic slope control voltage is below the bias voltage, then diode 52 will be blocked and diode 42 will conduct. By setting the bias voltage and the component values of each control leg, the direction of the tilt correction (either positive or negative slope) and the amount of tilt (value of the slope) can be adjusted.

Figure 8:
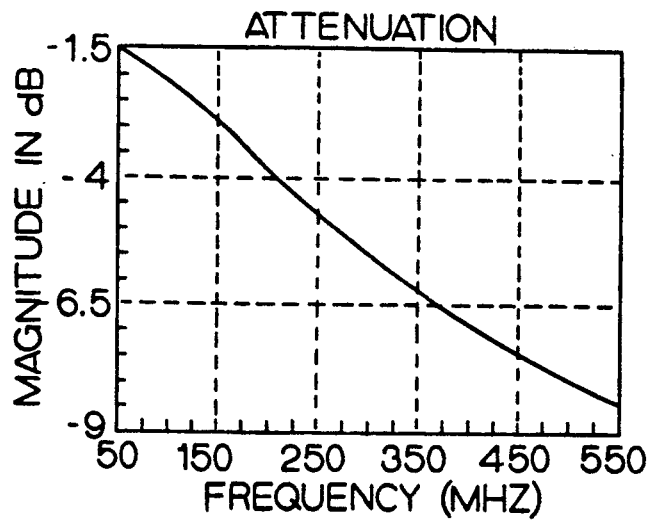
FIG. 8 is a graphical representation of attenuation as a function of frequency for the implementation illustrated in FIG. 6 when the parallel leg is active.
Figure 9:
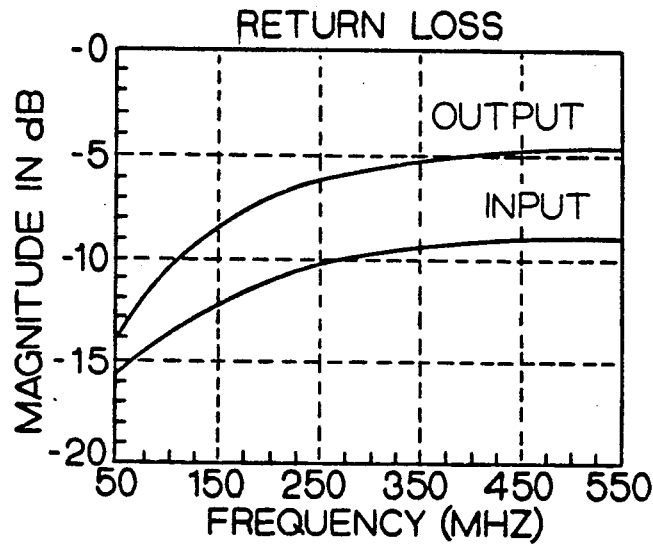
FIG. 9 is a graphical representation of return loss as a function of frequency for the implementation illustrated in FIG. 6 when the parallel leg is active.

FIGS. 8 and 9 illustrate the response of the network of FIG. 7 for the case where diode 52 is conducting, i.e., the control voltage is above the bias voltage. It is seen in FIG. 8 that the attenuation characteristic is negative with frequency which will counter actual positive slope. This curve suggests that the frequency response of the capacitor 56 dominates; the parallel inductance 54 is very large compared to it, i.e., appears to be infinite. Further, the controlled resistance (diode 42) appears to be infinite, i.e., the diode is blocked. For reasonable values of the elements of the network, it is seen that in FIG. 9 the input and output return loss are relatively flat and at acceptable levels.

Figure 11:
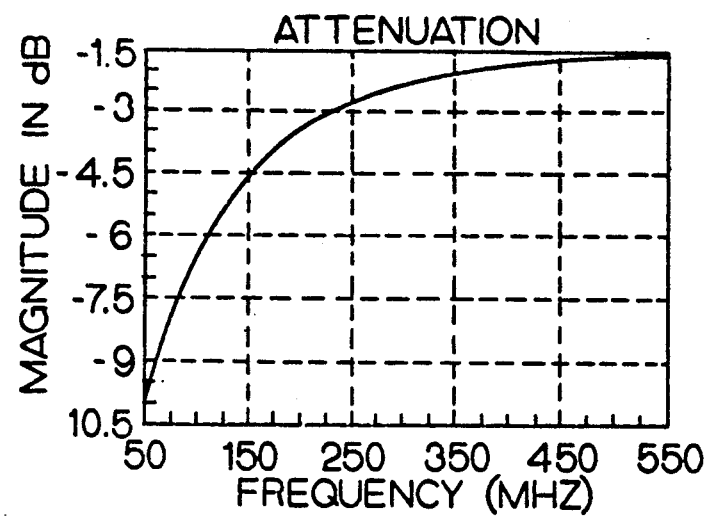
FIG. 11 is a graphical representation of attenuation as a function of frequency for the implementation illustrated in FIG. 6 when the series leg is active.
Figure 12:
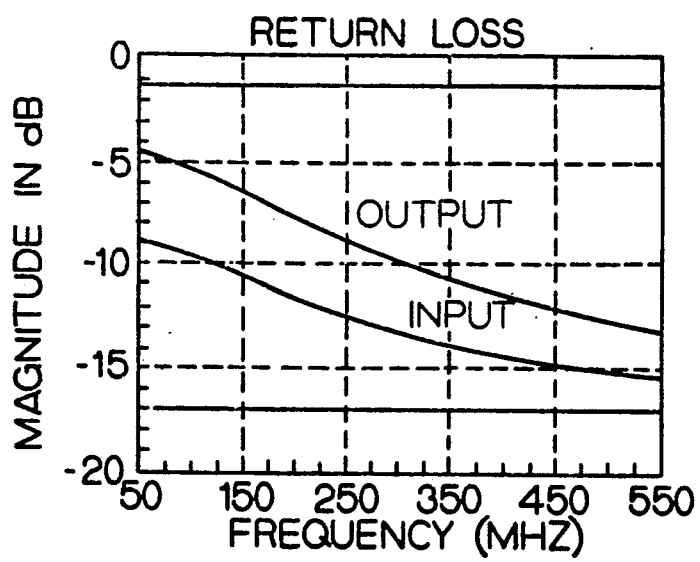
FIG. 12 is a graphical representation of return loss as a function of frequency for the implementation illustrated in FIG. 6 when the series leg is active.

Similarly, FIGS. 11 and 12 illustrates the response of the network in FIG. 7 for the opposite situation. This is where the attenuation response characteristic is positive (FIG. 11) such that negative actual slope can be compensated. In operation, the series tuned circuit is operative because diode 42 conducts and inductor 44 dominates the response. The capacitor 46 is chosen to be much greater than the inductor 44, i.e., to appear infinite. Further, the parallel leg is blocked by the infinite impedance of reversed biased diode 52. The return loss is acceptably flat (FIG. 12) for these criteria of the network.

Figure 10:
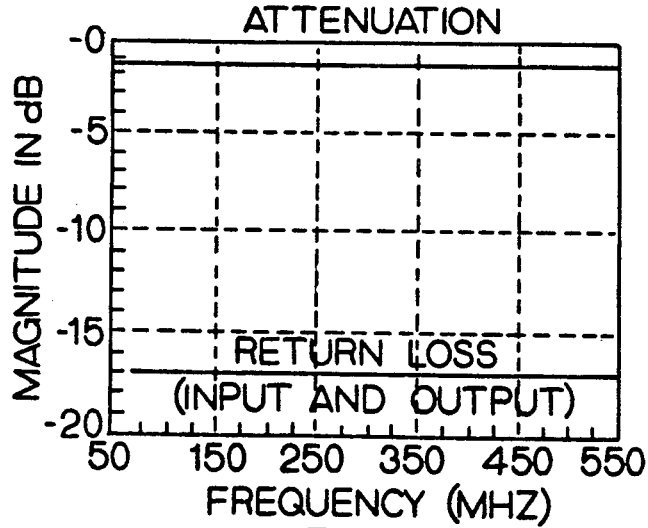
FIG. 10 is a graphical representation of attenuation and return loss as a function of frequency for the implementation illustrated in FIG. 6 when neither leg is active.

Moreover, referring now to FIG. 10 and assuming a neutral control voltage, within ±0.6 V of the bias voltage, the network will exhibit a neutral attenuation characteristic (zero slope) and have a flat input and output return loss across the CATV spectrum.

While the preferred embodiments of the invention have been shown and described, it will be obvious to one of skilled in the art that various modifications and changes may be made thereto without departing from the spirit and scope of the invention which is hereinafter defined in the appended claims.

What is claimed is:

1. A controlled compensation network having an input terminal and an output terminal comprising:
   an impedance connected between the input terminal of the network and a junction node;
   an impedance connected between said junction node and the output terminal;
   a bridge impedance connected between the input terminal and the output terminal comprising the series combination of a first controlled resistance connected in parallel with a first impedance and a second controlled resistance connected in parallel with a second impedance;
   a shunt impedance connected between said junction terminal and ground comprising the parallel combination of a third controlled resistance connected in series with a third impedance and a fourth controlled resistance connected in series with a fourth impedance; and
   means for controlling the resistances of said first and third resistances in the opposite direction to said second and fourth resistances.

2. A compensation network as set forth in claim 1 wherein:
   at least one of said first, second, third, and fourth impedances is a tuned LC circuit.

3. A compensation network as set forth in claim 2 wherein:
   at least one of said first, second, third, and fourth impedances is a series tuned LC circuit.

4. A compensation network as set forth in claim 2 wherein:
   at least one of said first, second, third, and fourth impedances is a parallel tuned LC circuit.

5. A compensation network having an input terminal and an output terminal, comprising:
   an impedance connected between the input terminal and a junction node;
   an impedance connected between said junction node and the output terminal;
   a bridge impedance connected between the input terminal and the output terminal;
   a shunt impedance connected between the junction node and ground comprising the parallel combination of a first controlled resistance connected in series with a first impedance and a second controlled resistance connected in series with a second impedance; and
   means for controlling the resistance of said first and second controlled resistances in opposite directions.

6. A compensation network as set forth in claim 5 wherein:
   said first and second impedances are tuned LC circuits.

7. A compensation network as set forth in claim 6 wherein:
   said first and second impedances are series tuned LC circuits.

8. A compensation network as set forth in claim 6 wherein:
   said first and second impedances are parallel tuned LC circuits.

9. A compensation network having an input terminal and an output terminal comprising:
   an impedance connected between the input terminal and a junction node;
   an impedance connected between said junction node and the output terminal;
   a bridge impedance connected between the input terminal and the output terminal comprising the series combination of a first controlled resistance connected in parallel with a first impedance and a second controlled resistance connected in parallel with a second impedance;
   a shunt impedance connected between said junction node and ground; and
   means for controlling the resistance of said first and second controlled resistances in opposite directions.

10. A compensation network as set forth in claim 9 wherein;
   said first and second impedances are tuned LC circuits.

11. A compensation network as set forth in claim 10 wherein:
   said first and second impedances are series tuned LC circuits.

12. A compensation network as set forth in claim 10 wherein:
   said first and second impedances are parallel tuned LC circuits.

13. A slope compensation network for an off-premises CATV system which transmits a broadband television signal to a plurality of subscribers, said network having a control terminal, an input terminal, and an output terminal, comprising:
   an impedance connected between the input terminal and a junction node;
   an impedance connected between said junction node and the output terminal;
   a bridge resistance connected between the input terminal and the output terminal;
   a shunt impedance connected between the junction node and ground comprising the parallel combination of a first controlled resistance connected in series with a first impedance and a second controlled resistance connected in series with a second impedance; and
   wherein said control terminal is connected to said first and second controlled resistances to control their resistances in opposite directions in response to a control voltage indicative of the amount and direction of the slope in the broadband television signal.

14. A slope compensation network as set forth in claim 13 wherein:
   said impedance approximately matches 75 ohms.

15. A slope compensation network as set forth in claim 13 wherein:
   said first impedance is a parallel tuned LC circuit.

16. A slope compensation network as set forth in claim 15 wherein:
   said second impedance is a series tuned LC circuit.

17. A slope compensation network for an off-premises CATV system which transmits a broadband television signal to a plurality of subscribers, said network having a control terminal, an input terminal, and an output terminal, comprising:
   an impedance connected between the input terminal and a junction node;
   an impedance connected between said junction node and the output terminal;
   a bridge resistance connected between the input terminal and the output terminal;
   a shunt impedance connected between the junction node and ground comprising the parallel combination of a first controlled resistance having a first diode connected in series with a first impedance including a parallel tuned LC circuit and a second controlled resistance having a second diode connected in series with a second impedance including a series tuned LC circuit; and wherein said control terminal is connected to said first and second controlled resistances to control their resistances in opposite directions in response to a control voltage indicative of the amount and direction of the slope in the broadband television signal.

18. A slope compensation network as set forth in claim 17 which further includes:

a DC bias network connected to said junction node for providing a biasing voltage to said first and second diodes.

19. A slope compensation network a set forth in claim 18 wherein:

said first diode is connected between said parallel tuned circuit and said junction node and is poled to conduct for control voltages in excess of said bias voltage.

20. A slope compensation network as set forth in claim 18 wherein:

said second diode is connected between said series tuned circuit and said junction node and is poled to conduct for control voltages less than said bias voltage.

* * * * *